United States Patent Office

2,999,081
Patented Sept. 5, 1961

2,999,081
COMPOSITION COMPRISING PHENOL-ALDEHYDE RESIN AND HEAVY METAL HYDROXY HALIDE, AND PROCESS FOR THE VULCANIZATION OF RUBBER THEREWITH
David A. Stivers, St. Paul, Minn., assignor to Minnesota Mining and Manufacturing Company, St. Paul, Minn., a corporation of Delaware
No Drawing. Filed Sept. 15, 1958, Ser. No. 760,852
25 Claims. (Cl. 260—43)

This invention relates to the treatment of rubbers or elastomers to modify their characteristics. In one aspect, this invention relates to a process for the vulcanization or curing of rubbers or elastomers. In another aspect, this invention relates to a new curing or vulcanization composition. In still another aspect, this invention relates to new modifiers to be used in the vulcanization or curing formulation for the treatment of rubbers or elastomers. The process of this invention and the formulations used therein result in new and improved vulcanized or cured elastomers.

Natural rubber and synthetic rubbers after they have been produced must be treated in order to modify their physical properties to the desired extent, such as by improvement of their tensile strength, hardness and elongation. Such treatment is known as vulcanization or curing of the raw rubber or elastomers. In most instances, this curing treatment is effected during the forming or molding of the raw rubber into the desired shape, such as pneumatic tubes and tires. Many vulcanizing agents or curing agents are known in the art for this purpose. These curing agents vary considerably in their chemical and physical properties and some are utilizable with different rubbers and some are more universally utilizable. In most instances, the curing agent must be selected for the particular rubber to be cured or vulcanized. The curing is effected at an elevated temperature by milling in the curing agent and permitting sufficient time at the elevated temperature for the curing agent to react or release a material which reacts with the rubber or elastomer. Although many of the curing agents satisfy the physical properties of the ultimate product by increasing its tensile strength, hardness and elongation, often some undesirable side effects are observed during the vulcanization. One of these side effects is called "scorch." Scorch is a function of the activity of the vulcanizing agent and the temperature utilized and loosely speaking, is a result of too fast or premature a vulcanization at some point prior to the final forming of the end product. It is much to be desired, therefore, to provide a vulcanization formula which will suitably improve the physical properties of the vulcanized or curing rubber while at the same time eliminating scorch.

It is an object of this invention to provide a new and improved process for the treatment of rubbers or elastomers to improve the physical properties thereof.

Another object of this invention is to provide a process for the vulcanization or curing of rubber to reduce or eliminate scorch and permit more tolerance during handling, fabrication and vulcanization processes.

Another object of this invention is to provide a new and improved vulcanization formula which results in greatly enhanced properties of the material vulcanized.

Another object is to provide a process and vulcanization materials which are cheaper and more economical than those heretofore on the market.

Still another object is to provide modifiers to be used with a vulcanizing agent to precent scorch and other side reactions characteristic of that particular vulcanizing agent.

Still a further object is to provide a new process and a new vulcanization formula for vulcanization of Butyl rubber.

Another object is to provide a vulcanization formula and process whereby tensile strength and hardness is increased with the accompanying retention of its elastic properties.

Various other objects and advantages will become apparent to those skilled in the art from the accompanying description and disclosure.

The vulcanization formula or recipe of the present invention comprises a phenol-aldehyde resin in combination with a heavy metal hydroxy halide, such as stannous hydroxy chloride (Sn(OH)Cl), as a promoter or catalyst for the phenol-aldehyde resin vulcanizing agent. The weight ratio of vulcanizing agent to heavy metal hydroxy halide in the vulcanization recipe is between about 1:10 and about 10:1. The vulcanization recipe is utilized in the rubber or elastomer in a weight ratio of vulcanization agent to elastomer of about 1:100 to about 20:100. The use of a heavy metal hydroxy halide with the phenol-aldehyde resin vulcanizing agent results in a good cure or vulcanization of the rubber or elastomer by increasing the tensile strength and hardness with the accompanying retention of its elastic properties. The cure with the above vulcanization recipe is usually effected at a temperature of about 250° to about 400° F. for a period of time of at least about 5 minutes, usually less than about 120 minutes. In order to assure a complete cure of the rubber with the above vulcanization recipe a hydrogen halide donor is utilized in combination therewith. Such hydrogen halide donors include various alkyl halides; for example, secondary butyl chloride, n-heptyl chloride, and tertiary butyl chloride.

The phenol-aldehyde resins are excellent vulcanizing agents for various rubbers and elastomers. However, in the use of conventional promoters or catalysts with the above vulcanization agent, scorching of the product during vulcanization is observed at times. Promoters of the prior art include heavy metal halides, such as ferric chloride hexahydrate, zinc chloride, chromium chloride, stannous chloride, stannic chloride, aluminum chloride, mercuric chloride, stannic iodide, and aluminum bromide. The combination of these conventional promoters and the above vulcanizing agent may result in a good cure if great care is taken to control the temperature and time of processing and vulcanization within relatively narrow and specific limitations. However, in commercial production it is sometimes difficult, if not impossible, to maintain operating limits within the requirements of the phenol-aldehyde resin vulcanizing agent using conventional promoters or catalysts. In accordance with this invention, the substitution of a heavy metal hydroxy halide for conventional promoters or catalysts completely eliminates scorching of the vulcanization product but does result in an incomplete cure or vulcanization of the product. Where a complete cure is not desired or necessary, the combination of the vulcanizing agent and heavy metal hydroxy halide, in particular stannous hydroxy chloride, alone is satisfactory. However, where a complete cure is desired, it is necessary to include in the vulcanization recipe the above hydrogen halide donors. Apparently, stannous hydroxy chloride is not sufficiently active to promote a complete cure of the rubber during vulcanization and its activity must be increased by the use of a hydrogen halide donor. The donor apparently releases the hydrogen halide at a sufficient and appropriate rate to complete the cure without scorching.

The vulcanization or curing recipe of the present invention may be used with various rubbers and elastomers, both natural and synthetic rubbers. It may be used, for example, with many of the well known synthetic rubbers, such as neoprene (a polymer of chloroprene), Hycar rubber (a copolymer of butadiene and acrylonitrile), and GRS rubber (a copolymer of butadiene and styrene).

It is particularly adaptable for vulcanization of Butyl-type rubbers to give vulcanizates improved in heat resistance over the conventional recipes in addition to possessing the desirable freedom from scorch heretofore described. Butyl rubber is particularly difficult to vulcanize without scorching because of its low unsaturation. As a result, relatively narrow limits of vulcanization conditions, such as time and temperature, are required to prevent scorching with phenol-aldehyde-type vulcanizing agents. The present vulcanization recipe has been found to vulcanize and cure Butyl rubbers with elimination of scorching and at the same time give sufficient latitude in the conditions of vulcanization, such that it is commercially feasible and attractive.

Butyl-type rubbers are made by copolymerizing monoisoolefins, usually isobutylene or ethyl methyl ethylene, with a minor proportion of a conjugated diolefin, usually isoprene or butadiene. Butyl rubbers also include rubbers of this type containing a small amount of halogen, usually less than 10 percent of a halogen, such as chlorine. The halogen may be included in the rubber by treatment with a halogenating agent to saturate a double bond or to substitute halogen for a hydrogen. The monoisoolefins used are those containing four to seven carbon atoms. The diolefins used are acyclic conjugated diolefins having between about four and about fourteen carbon atoms, preferably four to six carbon atoms, per molecule. Such diolefins include isoprene, butadiene-1,3, piperylene, 2,3-dimethyl - 1,3 - butadiene, 3 - methyl - 1,3 - pentadiene, 2-methyl-1,3-pentadiene, hexadiene-1,3 hexadiene-2,4, 1,2-dimethylbutadiene-1,3, 1,3-dimethylbutadiene-1,3, 1-ethylbutadiene-1,3 and 1,4-dimethylbutadiene-1,3. The diene portion of the resulting rubber is usually present in an amount between about 0.5 and about 10 percent, preferably below 5 percent by weight. For convenience and clarity, reference will be made to these types of rubber as Butyl-type rubbers. The conditions for making such rubbers are known to those skilled in the art and since this invention does not relate to the rubber per se or its manner of manufacture, it is deemed unnecessary to discuss the details of such known manufacturing methods.

The phenol-aldehyde resins used as vulcanizing agents of this invention are thermosetting resins and are the reaction products of various aldehydes with various phenols. The preferred phenol-aldehyde resin is obtained by the reaction of formaldehyde or a polymer of formaldehyde or a compound capable of releasing formaldehyde during the reaction with one or a mixture of meta alkyl monohydric phenols. A suitable formaldehyde forming material is trioxane. Various other polymeric materials of formaldehyde capable of releasing formaldehyde are known as para-formaldehydes or polyoxymethylenes. Typical examples of suitable meta alkyl monohydric phenols include meta cresol, meta ethyl phenol, meta isopropyl phenol, 3,5-dimethyl phenol, 3-penta-decyl phenol, and 3-octyl phenol.

Another type of phenol-aldehyde resin is that obtained by the reaction of a formaldehyde or formaldehyde releasing material with a polyhydric phenol, such as the mononuclear polyhydric phenols, including 5-n-pentadecyl resorcinol, resorcinol, catechol, hydroquinone, methyl resorcinol, etc. and polynuclear phenols, such as 2,2-bis (4'-hydroxy phenoyl) propane, known on the market as "bis-phenolA," 4'-dihydroxy benzophenol, bis-(4-hydroxy phenyl) methane, 1,1-bis-(4-hydroxy phenyl) ethane, 1,1-bis-(4-hydroxy phenyl) isobutane, 2,2-bis-(4-hydroxy phenyl) butane, 2,2-bis-(4-hydroxy-2-methyl phenyl) propane, 2,2-bis-(4-hydroxy-2-tertiary butyl phenyl) propane, 2,2-bis-(2-hydroxy naphthyl) pentane, 1,5-dihydroxy naphthalene, etc. as well as such polyhydric phenols obtained by reacting a material selected from the class of hydroxybenzene, naphthol, anthranol, and homologues thereof with a phenol having an unsaturated hydrocarbon substituent on its ring nucleus.

In general, various aldehydes may be used for reacting with the phenol to obtain suitable thermosetting resins utilizable as vulcanizing agents. Such other aldehydes include acetaldehyde, propionaldehyde and butyraldehyde. Also, other phenols which may be used to react with an aldehyde, such as formaldehyde, include p-octyl phenol and p-nonyl phenol and other p-phenols.

The reaction of the aldehyde with the phenol is usually effected in the presence of a suitable catalyst, either acidic or basic, at a temperature between about 50 and 200° C., but below the decomposition of the reactants and the products. Suitable basic catalysts include alkali metal and alkali earth metal hydroxides and ammonium hydroxide. Suitable acidic catalysts include hydrochloric acid and sulfuric acid. Usually the reaction is effected under reflux conditions and the product is recovered as a solid after cooling and filtering from the reaction mass. The proportion of aldehyde to phenol is preferably in equal mole amounts. Generally, the mole ratio of aldehyde to phenol is between about 1:1 and about 5:1, but mole ratios above or below that given above may be used without departing from the scope of this invention. In general, the alkyl radical of the phenol is less than 16 carbon atoms, preferably less than 8 carbon atoms. The aldehyde is preferably less than 7 carbon atoms.

As previously stated, various conventional promoters or catalysts have been tried in combination with phenol-aldehyde-type vulcanizing agents and in particular, the meta-substituted phenol-aldehydes, and have been found to be very unsatisfactory. Stannous hydroxy chloride has been demonstrated to be very satisfactory as a promoter for the vulcanization of various rubbers with the phenol-aldehyde resin of this invention. The stannous hydroxy chloride is prepared by dissolving stannous chloride in water and adjusting the pH to one or less and collecting the completely hydrolyzed precipitate which is stannous hydroxy chloride. Precipitation is effected by dilution of the aqueous solution of stannous chloride with a large excess of water. The pH is preferably adjusted by the addition of dilute alkali. The precipitate may be an admixture of divalent basic tin chlorides. However, a substantial amount of stannous hydroxy chloride, $Sn(OH)Cl$, is present, usually a major proportion.

As previously disclosed, in order to assure complete vulcanization with the stannous hydroxy chloride catalyst, hydrogen halide donators are employed. These hydrogen halide donators are compounds which liberate hydrogen halides such as hydrogen chloride at the temperature and other conditions employed during the vulcanization. Aliphatic halides, such as secondary butyl chloride, n-heptyl chloride, n-butyl chloride, secondary butyl bromide, tertiary butyl chloride, tertiary amyl chloride, amylene dichloride, dichloro-p-dioxane, trichloroethylene and tetrachloroethylene are suitable as hydrogen halide donators, when used alone or together. The preferred halides are the alkyl halides, more preferably, secondary and tertiary alkyl halides. These hydrogen halide donators are employed in a weight ratio of 1:10 to 10:1 of halide donator to the vulcanizing agent. Preferably, approximately at least an equal amount of stannous hydroxy chloride to hydrogen halide donator is employed. In utilizing various hydrogen halide donators, it is difficult to control the amount of hydrogen halide liberated during the vulcanization. The mechanism of the interaction of stannous hydroxy chloride and the aliphatic halides is not fully understood. Since $Sn(OH)Cl$ is an acid acceptor as well as a reducing agent, the reaction may involve either acidification of the basic stannous chloride with a hydrogen halide or oxidation of the bivalent metal salt with halogen. In any event, I do not wish to be bound by any mechanism of reaction which occurs during the vulcanization process.

As is known in the prior art, various other additives may be included during vulcanization to impart thereto modified properties to the final product. One of the most common of such materials is carbon black. This material increases the wear resistance of the vulcanized rubber. In addition to carbon black, certain other materials have similar effects, such as titanium dioxide and silica. These materials are usually added in an amount of about 5 to 100 parts by weight to about 100 parts of rubber or elastomer, preferably an amount of about 15 to 50 parts by weight. In addition to the above materials added for purposes of increasing wear resistance, other conventional fillers, pigments and softeners may be included in the vulcanization mix. Ordinarily, these other materials are used in roughly small amounts, less than about 20 parts by weight per part by weight of elastomer or rubber. Such materials included in this latter category are finely divided clay, zinc oxide, iron oxide, etc.

Frequently in using various of these fillers, etc., in the vulcanization mix and in particular when using carbon black, stearic acid is utilized in a minor (1% wt.) amount to aid in incorporating the carbon black into the rubber or elastomer. Various additives and aids to the mixing operation therefore may be included within the scope of this invention without departing therefrom.

In accordance with this invention, the desired amount of the vulcanization recipe with any of the other additives are admixed with the elastomer or rubber using a Banbury mixer, a two-roll mill, or any other conventional mixing device. A particularly suitable type of equipment for admixing the ingredients into the rubber is a two-roll, differential speed, rubber mill equipped with a heat exchange means, for example, chambers cored for the purpose of cooling, since the heat generated by the high shearing force in mixing can be rapidly dissipated, preventing the mix from being raised to a temperature high enough to start vulcanization before it is desired. The various ingredients may be incorporated into the rubber either individually or in admixture and the ingredients may be placed therein in any order without departing from the scope of this invention.

The amount of vulcanization agent; namely, the phenol-formaldehyde resin employed for vulcanization of the rubber is used in a weight ratio of vulcanizing agent to elastomer of about 1:100 to 20:100, preferably between about 3:100 to about 10:100. The weight ratio of stannous hydroxy chloride to the vulcanizing agent used is about 1:10 to 10:1, preferably about 1:2 to 2:1.

For best results the vulcanization recipe is worked into the rubber in the milling operation by maintaining the temperature below 150° F. The milling is continued until the vulcanization ingredients are uniformly dispersed throughout the rubber. The milling operation usually requires a period of time of about one-half hour. After the material is thoroughly and uniformly dispersed in the rubber, the rubber is removed from the mill and molded or calendered, or vulcanized without molding or calendering, as the case may be. In any event, the next step is the vulcanization operation and it is usually carried out during the molding operation. Accordingly, the rubber containing the vulcanization recipe and any other ingredients added thereto for special purposes is injected into the mold which is heated to a temperature sufficient to raise the temperature of the rubber mass to between about 250° and about 400° F., preferably to a temperature between about 300 and 350° F. The vulcanization usually takes place in about 5 to 60 minutes in time, depending upon the temperature, preferably at least 20 minutes. The higher temperature of vulcanization, the shorter the period of vulcanization and vice versa. It is preferable that the mold be heated prior to the injection of the rubber mass into the mold. However, it is possible to inject the rubbery mass into the mold and then raise the temperature of the mold and rubbery mass without departing from the scope of this invention. After the vulcanization is complete in the mold, the molded mass of rubber is then removed and cooled. As a secondary step and sometimes preferable method, the rubbery mass recovered from the mold may be transferred to a baking oven in which the molded article is baked at the vulcanization temperature or slightly higher for a period of about 1 hour to about 24 hours, depending upon the cross-sectional thickness of the article. The baking operation may be carried out in the mold itself, if desired.

The following examples are offered as a better understanding of the invention and are not to be construed as unnecessarily limiting thereto. The examples include preparation of the starting materials and the vulcanization of typical rubbers, in particular, Butyl rubber.

EXAMPLE 1

300 grams of 3-pentadecylphenol, 100 grams of para-formaldehyde, 200 cc. of methanol and 10 grams of 50% aqueous solution of sodium hydroxide were placed in a glass flask fitted with stirrer, reflux condenser and thermometer. While said mass was being constantly stirred, the mass was heated to a temperature of 60° C. and maintained at that temperature for approximately 2 hours. Then to said mass which appeared to be a substantially clear solution, was added sufficient hydrochloric acid to lower the pH thereof to a value of 5. Then subsequently, it was heated while under vacuum of approximately 7 mm. of mercury pressure, the mass was heated to a temperature of about 75° C. to remove the methanol and water components thereof. Then the mass was cooled whereupon sodium chloride crystals settled out and the liquid layer was decanted. The liquid layer consisted essentially of 3-pentadecylphenol-formaldehyde organic reaction product and is a thermosetting composition as evidenced by the fact that when a sample thereof is spread on a hot plate maintained at a temperature of 300° F., at the end of 40 minutes, it has been found to be converted to the substantially non-flowing state at that temperature.

EXAMPLE 2

Employing the same procedure and components as those of Example 1, except that the amount of dilute hydrochloric acid employed was such that the pH of the mass, after such addition was reduced to value of 7.7 instead of 5. The decanted liquid consists essentially of 3-pentadecylphenol-formaldehyde organic reaction product and when a small sample thereof is spread on a hot plate at 300° F., after 5 minutes was found to have been converted to the non-flowing state at that temperature.

EXAMPLE 3

300 grams of 3-pentadecylphenol, 130 grams of para-formaldehyde, 500 grams of methanol, 80 grams of a 50% aqueous solution of sodium hydroxide were charged into a glass flask fitted with a stirrer, reflux condenser and thermometer. While being constantly stirred, the mass was externally heated to approximately 60° C. and maintained at that temperature for 3 hours. After the first two hours of the said three-hour period, a white crystalline material began to appear and continued to form during the remaining one hour of that heating period. At the end of said three-hour period, the mass was cooled to room temperature and at that temperature was found to be a liquid mass carrying a substantial amount of such white crystalline material therein. The white crystalline material was separated from the liquid portion of said mass by filtration and then immediately suspended in approximately 100 cc. of isopropyl ether. Then the pH of said mixture of said crystals in said isopropyl ether was carefully neutralized by the addition of dilute hydrochloric acid, to a pH of 5. In the course of this step, the crystalline material went into solution. This solution was washed several times with water in order to leach out sodium chloride therein and the solution was chilled to 5° C. whereupon crystalline material separated out. This crystalline material was filtered from the liquid component and dried under vacuum at 40° C, and later recrystallized from isohexane. The resultant white crystalline material consists essentially of 3-pentadecylphenol-formaldehyde organic reaction product, and was in the form of a white crystalline powder having a melting point of 80–87° C. When a sample thereof was spread on a hot plate at 300° F. and maintained thereon for a period of 40 minutes, at the end of that period, it will be found to be a non-flowing resin at that temperature.

EXAMPLE 4

120 grams of meta-ethylphenol, 100 grams of paraformaldehyde, 100 cc. of methanol and 10 grams of a 50% aqueous solution of sodium hydroxide were placed in a glass flask equipped with stirrer, reflux condenser and thermometer. While being constantly stirred, the mass was heated to a temperature of 50° C. and maintained at that temperature for 2 hours. Then sufficient dilute hydrochloric acid was added thereto to reduce the pH thereof to a value of 5.5. Then while under vacuum which eventually reached a value of 2 mm. of mercury pressure, the mass was heated to a temperature of 60° C. The mass was cooled to room temperature whereupon sodium chloride crystallized out and was separated therefrom to provide a liquid consisting essentially of metaethylphenol-formaldehyde organic reaction product, a sample of which, when placed as a thin film on a hot plate at 300° F. and maintained thereon for a period of 40 minutes, was found to be a non-flowing resinous mass at that temperature at the end of that period.

EXAMPLE 5

300 grams (1 mole) of 3-pentadecylphenol were dissolved in 1,000 cc. of methanol and 800 cc. of water. 80 grams of a 50% by weight aqueous solution of sodium hydroxide were added followed by slow addition of 80 cc. (1 mole) of 37% formaldehyde. This mixture was held at 50° C. for 4 hours and then allowed to stand overnight at room temperature. The mixture was found to contain considerable amounts of a crystalline material and was neutralized to a pH of 6 by the addition of hydrochloric acid, diluted further with water and extracted with diethyl ether. The ether solution was separated, and the ether removed by heating on a steam bath with the aid of vacuum. The resultant product was crystallized from isohexane and the crystallized material was found to have the following properties: appearance, yellowish white powder, melting point 87 to 90.5° C., gel time at 300° F. over 2 hours.

EXAMPLE 6

90 grams of 3-pentadecylphenol, 96 cc. of an aqueous solution of formaldehyde, 400 cc. of methanol, 200 cc. of water and 24 grams of a 50% aqueous solution of sodium hydroxide heated to 50° C. while being constantly stirred and held for several hours at that temperature. It was then allowed to stand at room temperature 48 hours. This was diluted with more water, and neutralized to a pH of 7 with hydrochloric acid and then extracted with ethyl ether. The ether solution was washed with water and chilled to 5° C. A slightly yellowish powder separated and was recrystallized from isohexane. This powder had the following properties: melting point, approximately 85° C., methylol value 12.5%, gel time at 300° F., approximately 20 minutes.

EXAMPLE 7

*Preparation of stannous hydroxy chloride*

Into 500 cc. of water, 225 grams of stannous chloride dihydrate ($SnCl_2$—$2H_2O$) was dissolved. Upon standing, and in particular with the aid of further dilution, the basic chloride $Sn(OH)Cl$ precipitates. (See Mellor's Modern Inorganic Chemistry, Longmans, Green and Co., p. 699.) This precipitate stannous hydroxy chloride is allowed to dry at room temperature before using.

An additional method, desirable because of faster and greater yields resulting therefrom, has been found to produce essentially the same basic salt $Sn(OH)Cl$. This technique requires the slow addition of dilute alkali (38 grams sodium hydroxide in 500 grams of water) to the original solution of $SnCl_2$—$2H_2O$ in water using rapid agitation and maintaining a maximum pH of 1.0.

When a pH range of 2.0 to 3.0 is permitted, a precipitate having slower vulcanization action is obtained.

EXAMPLE 8

The following example shows numerous runs made on the vulcanization of a Butyl rubber comprising isobutylene and about 3 percent butadiene. The various ingredients were milled into the rubber with a two-roll mill maintained at a temperature of about 150° F. or less until there was a uniform dispersion of the various ingredients in the amounts indicated in the table. The phenol-aldehyde resin vulcanizing agent utilized in the runs of Table I was 3-pentadecylphenol-formaldehyde resin such as that obtained from Example 1. The rubber mix was then placed between two heated plates and pressed for 30 minutes at a temperature of about 330° C. The resulting sheet of rubber was about 3/32 inch in thickness and the tests shown on the table were carried out on the sheet of vulcanized rubber. The tests and measurements of the table are standard A.S.T.M. tests.

TABLE I

Butyl rubber ---------- 100 pts. by wt.
Carbon black ---------- 50 pts. by wt.
Stearic acid ---------- 1 pt. by wt.

| | A | B | C | D | E | F | G | H | I | J | K | L | M | N | O | P | X |
|---|---|---|---|---|---|---|---|---|---|---|---|---|---|---|---|---|---|
| Phenol-aldehyde resin | 6 | 6 | 9 | 6 | 6 | 6 | 6 | 6 | 6 | 6 | 6 | 6 | 6 | 6 | 6 | 6 | 6 |
| Sn(OH)Cl | 3.8 | 7.6 | 3.8 | 3.8 | 3.8 | 7.6 | 3.8 | 3.8 | 3.8 | 3.8 | 7.6 | 7.6 | 3.8 | 3.8 | 7.6 | 3.8 | |
| Sec-Butyl Chloride | | | | 2.1 | 4.2 | 1.05 | 4.2 | | 8 | 12 | 2.1 | 4.2 | | | | | |
| N-Butyl Chloride | | | | | | | | 4.2 | | | | | | | | | |
| N-Heptyl Chloride | | | | | | | | | | | | | 4.8 | 8 | 2.1 | | |
| Tert-Butyl Chloride | | | | | | | | | | | | | | | | 0.5 | |
| Sec-Butyl Bromide | | | | | | | | | | | | | | | | | |
| Stannous Chloride Dihydrate | | | | | | | | | | | | | | | | | 2.5 |
| Original Properties: | | | | | | | | | | | | | | | | | |
| Tensile, p.s.i. | 600 | 250 | 260 | 1,060 | 1,280 | 1,050 | 1,700 | 1,000 | 1,420 | 1,520 | 920 | 1,280 | 1,080 | 560 | 510 | 1,320 | 2,090 |
| Elongation, Percent | 720 | 540 | 550 | 550 | 465 | 550 | 430 | 580 | 480 | 480 | 530 | 470 | 435 | 590 | 550 | 500 | 340 |
| Hardness, Shore A | 58 | 63 | 65 | 62 | 59 | 59 | 61 | 58 | 62 | 60 | 65 | 65 | 56 | 60 | 62 | 63 | 62 |
| 300% Modulus | 290 | 230 | 230 | 520 | 700 | 515 | 1,070 | 500 | 810 | 790 | 560 | 740 | 650 | 300 | 350 | 730 | 1,890 |
| Percent Set at Break | 60 | 60 | 60 | 15 | 9 | 24 | 3 | 15 | 6 | 6 | 15 | 6 | 6 | 21 | 36 | 9 | |
| Aged 1 day/350° F.: | | | | | | | | | | | | | | | | | |
| Tensile, p.s.i. | | | | 900 | 1,110 | 880 | 1,380 | 1,540 | 1,070 | 1,020 | 1,120 | 1,360 | 1,050 | 810 | 1,100 | 1,400 | |
| Elongation, Percent | | | | 425 | 370 | 400 | 365 | 385 | 420 | 430 | 390 | 410 | 380 | 460 | 380 | 375 | |
| Hardness, Shore A | | | | 73 | 70 | 70 | 64 | 61 | 70 | 70 | 72 | 71 | 70 | 70 | 70 | 65 | |
| 100% Modulus | | | | 290 | 260 | 240 | 340 | 360 | 270 | 270 | 310 | 320 | 260 | 230 | 350 | 345 | |
| Percent Set at Break | | | | 12 | 6 | 6 | | | 9 | 9 | 6 | 6 | 6 | 18 | 6 | | |
| Aged 7 days/300° F.: | | | | | | | | | | | | | | | | | |
| Tensile, p.s.i. | 440 | 500 | 550 | 790 | 1,190 | 910 | | | 1,140 | 1,130 | 1,200 | 1,380 | 1,050 | 650 | 1,070 | | 1,710 |
| Elongation, Percent | 445 | 300 | 290 | 350 | 330 | 400 | | | 350 | 380 | 360 | 370 | 380 | 500 | 380 | | 240 |
| Hardness, Shore A | 67 | 75 | 77 | 72 | 71 | 70 | | | 72 | 75 | 76 | 76 | 68 | 72 | 72 | | 71 |
| 100% Modulus | 185 | 280 | 310 | 300 | 370 | 260 | | | 330 | 330 | 380 | 370 | 280 | 230 | 370 | | |
| Percent Set at Break | 30 | 6 | 6 | 9 | 3 | 12 | | | 6 | 6 | 6 | 6 | 6 | 20 | 6 | | |
| MS-250° F. (minutes to 10 pt. rise) | | | | 20+ | 15+ | 20+ | 15+ | 15+ | 15+ | 15+ | 15+ | 12-14 | 15+ | 15+ | 15+ | | 2 |

Runs A, B and C, using only stannous hydroxy chloride, resulted in an incompletely vulcanized rubber as evidenced by the tensile strength and hardness and modulus of elasticity. All of the runs, D through P, resulted in a completely vulcanized product with good physical properties. The Mooney Scorch Reading indicated, by requiring at least 10 minutes to raise 10 points, that no scorch was obtained. Run X was a control run made with stannous chloride, and although the product was completely cured, severe scorch was observed as indicated by the Mooney Scorch Reading. A tensile strength of 1000 p.s.i. or better after vulcanization is one indication of a good cure. No significant decrease in tensile strength, hardness and elongation after aging at elevated temperatures also is another measure of a proper cure.

Tests repeated with substantially the same ingredients and proportions as in the table under similar conditions but with the substitution of other catalysts or promoters resulted in an incomplete cure and breakdown of the rubber during aging at elevated temperatures. Such other catalysts tried but found to be unsatisfactory were ferric chloride, stannous iodide, ammonium chloride, mercurous chloride, mercuric chloride, aluminum bromide and dibutyl tin dichloride.

All of the various phenol-aldehyde resins disclosed in the present invention may be similarly utilized as in the runs of Table I as the vulcanizing agent in combination with stannous hydroxy chloride. The amounts of the various ingredients with the other phenol-aldehyde resins are substantially the same as those shown in Table I and as recommended hereinbefore.

More than one vulcanizing agent and hydrogen halide donator may be employed at the same time during the vulcanization. It should be made clear that any of the respective ingredients may be used in any combination. For example, one vulcanizing agent may be used with a mixture of two or more hydrogen halide donators. Also one hydrogen halide donator may be used with two or more vulcanizing agents for the same vulcanization operation.

Various sequences of steps of adding the ingredients to the rubber mix may be employed without departing from the scope of this invention. However, it is essential that the stannous hydroxy chloride and the hydrogen halide donator be present with the phenol-aldehyde resin during the vulcanization operation. Certain alternatives and modifications, such as the use of various types of machinery and equipment for mixing and vulcanizing, may become apparent to those skilled in the art without departing from the scope of this invention. The operating conditions, such as temperature and catalyst, are essential to the invention but obvious modifications and minor alternatives thereof as well as certain substitutions may become obvious to those skilled in the art without departing from the scope of this invention.

I claim:

1. A process for the vulcanization of a raw conjugated diene rubber which comprises incorporating with said rubber a meta-substituted phenol-formaldehyde resin as a vulcanizing agent, stannous hydroxy chloride as a catalyst, and a normally liquid alkyl chloride as a hydrogen chloride donator, in an amount such that the vulcanizing agent is present in a weight ratio of about 1:100 to about 20:100 of vulcanizing agent to elastomer and the stannous hydroxy chloride catalyst and the hydrogen chloride donator are present, respectively, in an amount between about 1:10 and about 10:1 of vulcanizing agent to these ingredients, heating the resulting mixture at a temperature between about 250° and about 400° F. for a period of time of at least 5 minutes to vulcanize the rubber without substantial scorch.

2. The process of claim 1 in which said hydrogen chloride donator is sec-butyl chloride.

3. The process of claim 1 in which said hydrogen chloride donator is n-heptyl chloride.

4. The process of claim 1 in which said hydrogen chloride donator is tertiary butyl chloride.

5. The process of claim 1 in which said phenol-formaldehyde resin is meta pentadecylphenol-formaldehyde resin.

6. A process for the vulcanization of a raw Butyl-type rubber comprising a copolymer of a monoisoolefin and a conjugated diolefin which comprises incorporating with said rubber a meta alkyl phenol-formaldehyde resin as a vulcanizing agent in which the alkyl radical has less than 16 carbon atoms, stannous hydroxy chloride as a catalyst, and a normally liquid alkyl chloride as a hydrogen chloride donator, in an amount such that the vulcanizing agent is present in a weight ratio of about 3:100 to about 10:100 of vulcanizing agent to elastomer and the stannous hydroxy chloride catalyst and the hydrogen chloride donator are present, respectively, in an amount between about 1:2 and about 2:1 of vulcanizing agent to these ingredients, heating the resulting mixture at a temperature between about 300° and about 350° F. for a period of time of at least 10 minutes to vulcanize the rubber without substantial scorch.

7. A process for the vulcanization of a raw conjugated diene rubber which comprises incorporating with said rubber a meta-substituted phenol-formaldehyde resin as a vulcanizing agent, stannous hydroxy chloride as a catalyst, and a normally liquid organic aliphatic chloride as a hydrogen chloride donator, in an amount such that the vulcanizing agent is present in a weight ratio of about 1:100 to about 20:100 of vulcanizing agent to elastomer and the stannous hydroxy chloride catalyst and the hydrogen chloride donator are present, respectively, in an amount between about 1:10 and about 10:1 of vulcanizing agent to these ingredients, heating the resulting mixture to vulcanize the rubber without substantial scorch.

8. A process for the vulcanization of a raw conjugated diene rubber which comprises incorporating with said rubber a meta-substituted phenol-formaldehyde resin as a vulcanizing agent and stannous hydroxy chloride as a catalyst in an amount such that the vulcanizing agent is present in a weight ratio of about 1:100 to about 20:100 of vulcanizing agent to elastomer and heating the resulting mixture at a temperature between about 250° and about 400° F. for a period of time of at least 5 minutes to vulcanize the rubber without substantial scorch.

9. A process for the vulcanization of a raw conjugated diene rubber which comprises incorporating with said rubber a phenol-aldehyde resin as a vulcanizing agent and stannous hydroxy chloride as a catalyst in an amount such that the vulcanizing agent is present in a weight ratio of about 1:100 to about 20:100 of vulcanizing agent to elastomer and heating the resulting mixture at a temperature between about 250° and about 400° F. for a period of time of at least 5 minutes to vulcanize the rubber without substantial scorch.

10. A process for the vulcanization of a raw conjugated diene rubber which comprises incorporating with said rubber a phenol-aldehyde resin as a vulcanizing agent, stannous hydroxy chloride as a catalyst, and a normally liquid organic aliphatic halide as a hydrogen halide donator, in an amount such that the vulcanizing agent is present in a weight ratio of about 1:100 to about 20:100 of vulcanizing agent to elastomer and the stannous hydroxy chloride catalyst and the hydrogen halide donator are present, respectively, in an amount between about 1:2 and about 10:1 of vulcanizing agent to these ingredients, heating the resulting mixture to vulcanize the rubber without substantial scorch.

11. A process for the vulcanization of a raw conjugated diene rubber which comprises incorporating with said rubber a phenol-aldehyde resin as a vulcanizing agent and stannous hydroxy chloride as a catalyst, heating the resulting mixture to vulcanize the rubber without substantial scorch.

12. A process for the vulcanization of a raw conjugated diene rubber which comprises incorporating with said rubber a phenol-aldehyde resin as a vulcanizing agent and a heavy metal hydroxy halide as a catalyst, heating the resulting mixture to vulcanize the rubber without substantial scorch.

13. A vulcanization composition which comprises a meta-substituted phenol-formaldehyde resin as a vulcanizing agent, stannous hydroxy chloride and a normally liquid alkyl halide, the weight ratio of vulcanizing agent to stannous hydroxy chloride and alkyl halide, respectively, being between about 1:10 and about 10:1.

14. The composition of claim 13 in which said alkyl halide is sec-butyl chloride.

15. A vulcanization composition which comprises a met-substituted phenol-formaldehyde resin as a vulcanizing agent and stannous hydroxy chloride, the weight ratio of vulcanizing agent to stannous hydroxy chloride being between about 1:10 and about 10:1.

16. A vulcanization composition which comprises a phenol-aldehyde resin as a vulcanizing agent, stannous hydroxy chloride and a normally liquid organic aliphatic halide, the weight ratio of vulcanizing agent to stannous hydroxy chloride and aliphatic halide, respectively, being between about 1:10 and about 10:1.

17. A vulcanization composition which comprises a meta alkyl phenol-formaldehyde resin as a vulcanizing agent in which the alkyl radical has less than 16 carbon atoms, stannous hydroxy chloride and a normally liquid organic aliphatic chloride, the weight ratio of vulcanizing agent to stannous hydroxy chloride and aliphatic chloride, respectively, being between about 1:2 and about 2:1.

18. A vulcanization composition which comprises an alkyl phenol-formaldehyde resin as a vulcanizing agent and stannous hydroxy chloride.

19. A vulcanization composition which comprises a phenol-aldehyde resin as a vulcanizing agent and a heavy metal hydroxy halide.

20. A vulcanization admixture comprising a Butyl rubber comprising a copolymer of isobutylene and a minor amount of conjugated butadiene, a meta-substituted phenol-formaldehyde resin as a vulcanization agent, stannous hydroxy chloride as a catalyst and a normally liquid alkyl halide as a hydrogen halide donor, the vulcanizing agent being present in said composition in a weight ratio of vulcanizing agent to rubber of about 1:100 to about 20:100 and the amount of catalyst and hydrogen halide donor being present in the mixture in a weight ratio of vulcanizing agent to each of the above materials, respectively, between about 1:10 and about 10:1.

21. A vulcanization admixture comprising a conjugated diene rubber, phenol-aldehyde resin as a vulcanization agent, stannous hydroxy chloride as a catalyst and a normally liquid organic aliphatic halide as a hydrogen halide donor, the vulcanizing agent being present in said composition in a weight ratio of vulcanizing agent to rubber of about 1:100 to about 20:100 and the amount of catalyst and hydrogen halide donor being present in the mixture in a weight ratio of vulcanizing agent to each of the above materials, respectively, between about 1:10 and about 10:1.

22. A vulcanization admixture comprising a Butyl rubber comprising a copolymer of isobutylene and a minor amount of conjugated butadiene, a meta-substituted phenol-formaldehyde resin as a vulcanization agent, stannous hydroxy chloride as a catalyst and a normally liquid organic aliphatic halide as a hydrogen halide donor.

23. A vulcanization admixture comprising a Butyl rubber comprising a copolymer of isobutylene and a minor amount of conjugated butadiene, a meta alkyl phenol-formaldehyde resin as a vulcanization agent, stannous hydroxy chloride as a catalyst and a normally liquid organic aliphatic chloride as a hydrogen chloride donor, the vulcanizing agent being present in said composition in a weight ratio of vulcanizing agent to rubber of about 3:100 to about 10:100 and the amount of catalyst and hydrogen halide donor being present in the mixture in a weight ratio of vulcanizing agent to each of the above materials, respectively, between about 1:2 and about 2:1.

24. A vulcanization admixture comprising a conjugated diene rubber, a meta-substituted phenol-formaldehyde resin as a vulcanization agent and stannous hydroxy chloride as a catalyst.

25. A vulcanization admixture comprising a conjugated diene rubber, phenol-aldehyde resin as a vulcanization agent, and a heavy metal hydroxy halide as a catalyst.

References Cited in the file of this patent

UNITED STATES PATENTS

| | | |
|---|---|---|
| 2,726,224 | Peterson et al. | Dec. 6, 1955 |
| 2,727,874 | Peterson et al. | Dec. 20, 1955 |